US007900885B2

(12) United States Patent
Sfaxi et al.

(10) Patent No.: US 7,900,885 B2
(45) Date of Patent: Mar. 8, 2011

(54) ELECTROMAGNETIC ACTUATOR WITH PERMANENT MAGNETS WHICH ARE DISPOSED IN A V-SHAPED ARRANGEMENT

(75) Inventors: Mahmoud Sfaxi, Paris (FR); Emmanuel Talon, Verneuil sur Seine (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 416 days.

(21) Appl. No.: 12/091,763

(22) PCT Filed: Nov. 30, 2006

(86) PCT No.: PCT/FR2006/002623

§ 371 (c)(1), (2), (4) Date: Apr. 28, 2008

(87) PCT Pub. No.: WO2007/063223

PCT Pub. Date: Jun. 7, 2007

(65) Prior Publication Data

US 2008/0283784 A1 Nov. 20, 2008

(30) Foreign Application Priority Data

Dec. 2, 2005 (FR) ..................................... 05 12239
Dec. 2, 2005 (FR) ..................................... 05 12241
Dec. 2, 2005 (FR) ..................................... 05 12243

(51) Int. Cl.
*F16K 31/08* (2006.01)

(52) U.S. Cl. ....................... 251/65; 251/129.15; 335/302

(58) Field of Classification Search .................... 251/65, 251/129.15; 335/296, 297, 302
See application file for complete search history.

(56) References Cited

U.S. PATENT DOCUMENTS 3,241,304 A * 3/1966 Mattingly et al. .............. 57/284
3,503,019 A 3/1970 Kussy et al.
4,045,696 A * 8/1977 Lutz et al. .................. 310/49.43

(Continued)

FOREIGN PATENT DOCUMENTS

DE 199 22 422 A1 11/2000

(Continued)

OTHER PUBLICATIONS

International Search Report for PCT/FR2006/002623 mailed on Apr. 1, 2007 (6 pages).

*Primary Examiner* — John K Fristoe, Jr.
(74) *Attorney, Agent, or Firm* — Osha • Liang LLP

(57) ABSTRACT

An electromagnetic actuator includes a coil, a core designed to channel a flux of the coil so as to form a return path in an armature, the core having a base from which branches extend, including a central branch around which the coil extends, and two permanent magnets associated with the core so that the latter channels a flux of the permanent magnets so as to form a return path in the armature, the flux of the coil passing through the magnets. The two permanent magnets are placed in the central branch of the core so as to form a V, which separates the central branch into a support part, which supports the permanent magnets and is integral with the base, and an end part lying above the permanent magnets. The end part has an active face facing the armature in which a groove lies parallel to the permanent magnets.

8 Claims, 2 Drawing Sheets

U.S. PATENT DOCUMENTS 4,152,570 A * 5/1979 Inoue et al. .................. 219/69.2
6,124,648 A * 9/2000 Shibuya et al. ............ 310/12.21
7,249,579 B2 * 7/2007 Liang et al. ................ 123/90.11
7,584,727 B2 * 9/2009 Liang et al. ................ 123/90.11
2004/0217313 A1 11/2004 Sedda et al.
2005/0211200 A1 9/2005 Liang et al.

FOREIGN PATENT DOCUMENTS

DE 100 03 928 A1 6/2001

* cited by examiner

ELECTROMAGNETIC ACTUATOR WITH PERMANENT MAGNETS WHICH ARE DISPOSED IN A V-SHAPED ARRANGEMENT

The invention relates to an electromagnetic actuator having permanent magnets arranged in the form of a V.

BACKGROUND OF THE INVENTION

Document FR 2 865 238 discloses an electromagnetic actuator having an actuating member associated with an armature that can move under the action of an electromagnet, comprising a coil and a core suitable for channeling the flux of the coil so as to form a return path in the armature, the core having a base from which branches extend, including a central branch around which the coil extends. The electromagnet comprises two permanent magnets which are incorporated into the core in such a way that the latter channels the flux of the permanent magnets so as to form a return path in the armature, the flux of the coil passing through the magnets. In one of the embodiments illustrated in that document, the permanent magnets are placed obliquely in the lateral branches of the core, thereby making it possible to house, in the core, magnets having a length substantially equal to the height of the coil without correspondingly increasing the height of the electromagnet.

However, such an arrangement means that the laminations of the core have to be cut so as to allow the magnets to be inserted, thereby mechanically weakening the laminations and posing assembly problems. Furthermore, the gap between the core laminations and the permanent magnets depends on the precision with which the laminations are cut, something that is therefore difficult to control.

SUBJECT OF THE INVENTION

The subject of the invention is an electromagnetic actuator having oblique magnets that is easier to assemble.

BRIEF DESCRIPTION OF THE INVENTION

To achieve this objective, the invention provides an electromagnetic actuator, having an actuating member associated with an armature and capable of moving under the action of at least one electromagnet, which comprises: a coil; a core designed to channel the flux of the coil so as to form a return path in the armature, the core having a base from which branches extend, including a central branch around which the coil extends; and two permanent magnets which are associated with the core so that the latter channels the flux of the permanent magnets so as to form a return path in the armature, the flux of the coil passing through the magnets. According to the invention, the two magnets are placed in the central branch of the core so as to form a V, which separates the central branch into a support part, which supports the magnets and is integral with the base, and an end part lying above the magnets.

Thus, the core is separated into a main part, incorporating the part for supporting the magnets, the access to which, for positioning the permanent magnets, is completely free, and an end part, which is attached to the magnets placed on the support part so as to lie above them, the end part being centered by itself on the V formed by the permanent magnets. The assembly of the actuator is thereby made easier.

It is therefore sufficient to exert a compressive force on the end part in order to reduce, or even eliminate, the gap between the permanent magnets and the laminations constituting the core.

BRIEF DESCRIPTION OF THE DRAWINGS

The invention will be more clearly understood in the light of the following description with reference to the figures of the appended drawings in which.

DETAILED DESCRIPTION OF THE INVENTION

Figure 1:
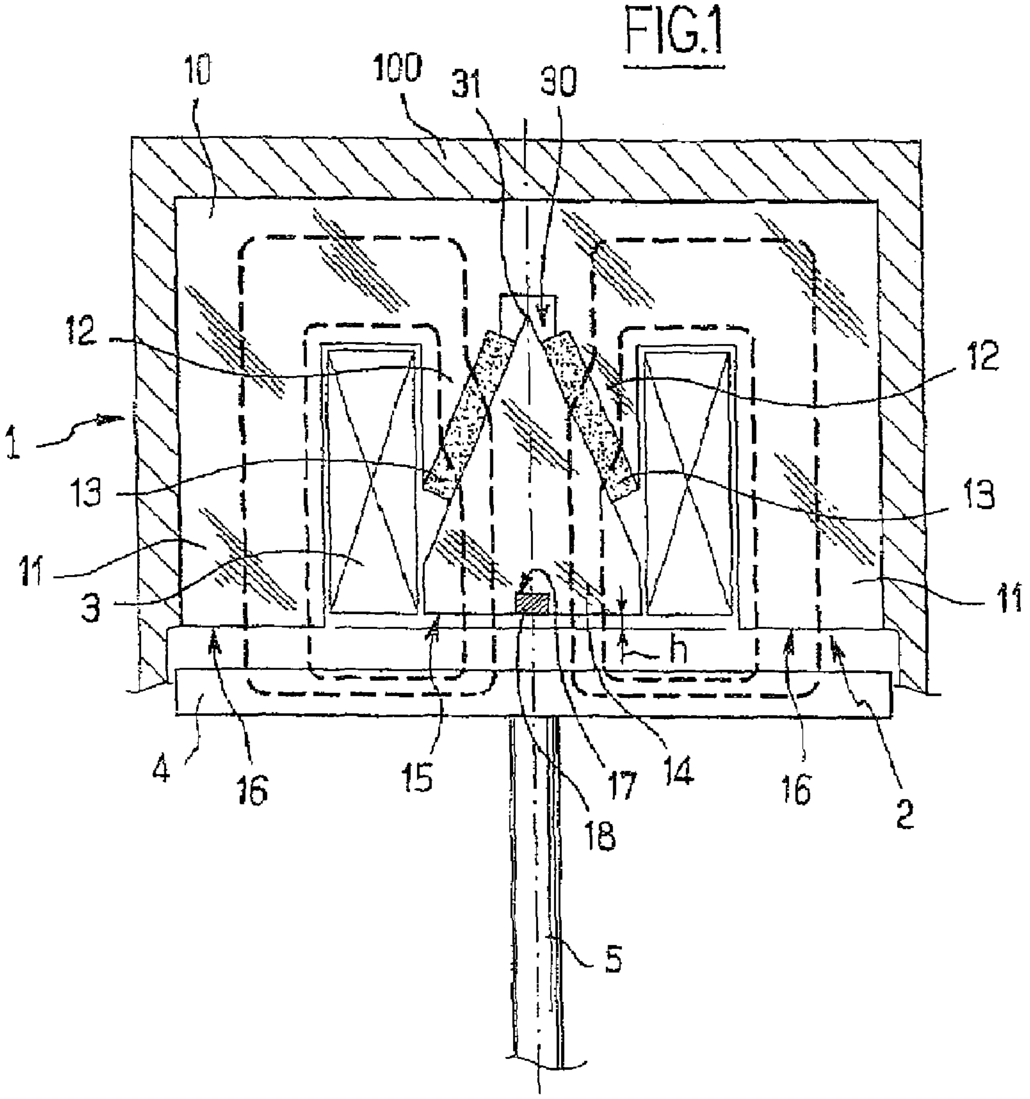
FIG. 1 is a partial schematic sectional view of an actuator according to the invention.

As shown in FIG. 1, the electromagnetic actuator of the invention comprises an electromagnet 1 with a core 2 and a coil 3. The electromagnet 1 exerts an electromagnetic force in a controlled manner on an armature 4 integral with a pushrod 5 that can move along the X axis.

Such an actuator is, for example, used to actuate an internal combustion engine valve, the actuator being placed in such a way that the pushrod 5 extends along the sliding axis of the valve. As is known, the actuator includes another electromagnet (not shown) that extends opposite the electromagnet 1 so as to selectively attract the armature 4 in the opposite direction. The end of the pushrod 5 and the end of the valve are returned to each other by opposing springs (not shown) that define an equilibrium position of the pushrod/valve assembly in which the armature extends substantially at mid-path between the two electromagnets.

The core 2 of the electromagnet 1 has a base 10 from which two lateral branches 11 and a central branch extend, the coil 3 extending around said central branch. The central branch comprises two portions 12 with facing inclined faces integral with the base 10. The portions 12 form a support part, for supporting the core 2, said part being designed to accommodate permanent magnets 13 so that the latter extend obliquely to the X axis and form a V, the point of which here is turned toward the base 10. A wedge 14 forming an end part of the central branch is thus formed in the V.

The path of the flux lines generated by the permanent magnets 13, which pass through the core 2 so as to form a return path in the armature 4, is depicted as the bold dashed lines in FIG. 1. The wedge 14 has an end face 15 in which a groove 17 lies parallel to the permanent magnets 13. The groove 17 ensures that there is a sharp separation between the respective flux lines of the two permanent magnets 13 that pass on either side of the groove 17.

As may be seen in FIG. 3 (in which the core is illustrated upside-down with respect to FIG. 1), the actuator is mounted as follows. After having formed the core 2 by assembling the laminations that form the base 10, the lateral branches 11 and the support portions 12, the permanent magnets 13 are put into position on the support portions 12. In this regard, the support portions 12 include steps 50 making it easier to position the magnets 13. After having formed the wedge 14, by assembling the corresponding laminations, the wedge 14 is then attached to the permanent magnets 13 as indicated by the arrow. The wedge 14 then lies above the permanent magnets 13 and is self-centered by the V formed by the permanent magnets 13.

Figure 3:
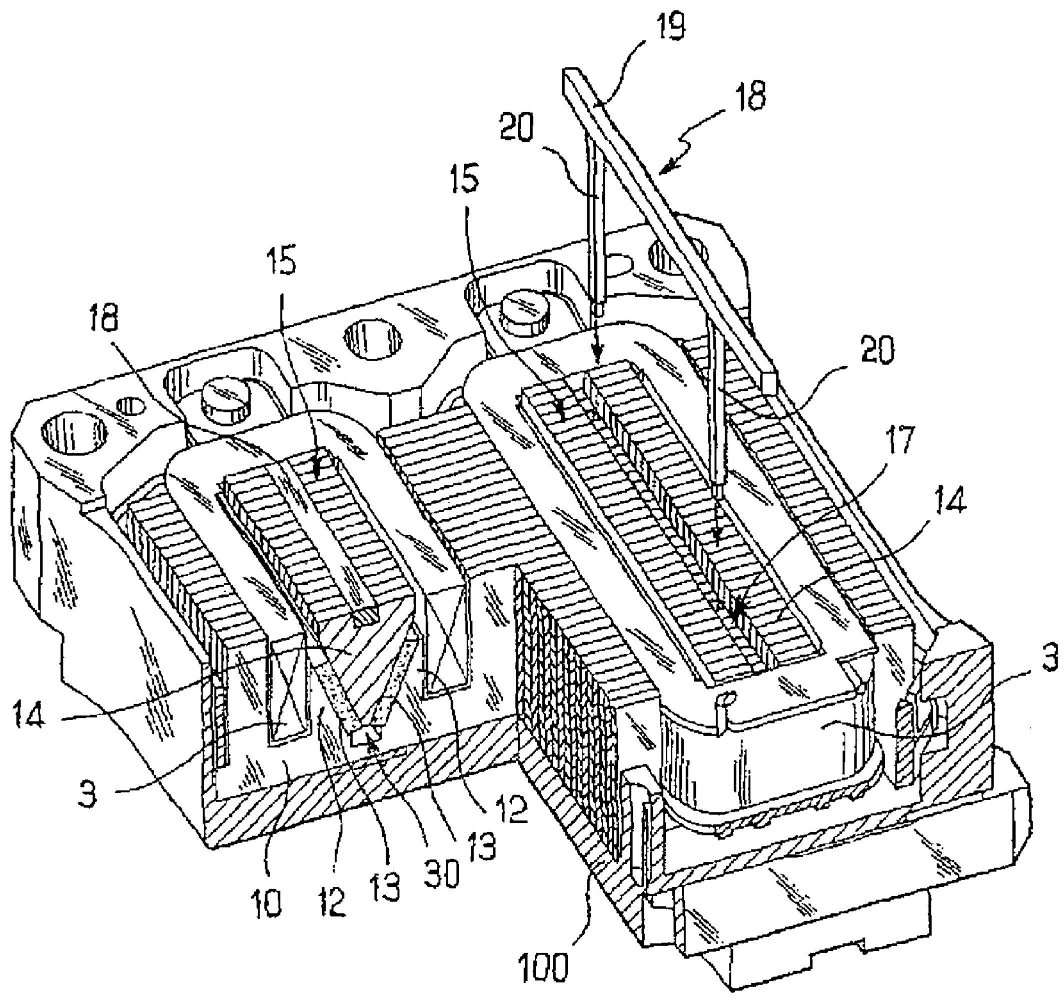
FIG. 3 is a view in partially exploded, cast-away perspective of a double electromagnetic actuator according to the invention.

FIG. 3 shows a double actuator intended for actuating two pushrods (not shown). In this regard, the double actuator comprises two coils 3 and a common core 2 obtained by juxtaposing two cores identical to that illustrated in FIG. 1 and by forming a single branch of the two juxtaposed lateral branches. As previously, the core 2 has central branches around which the coils 3 extend, the central branches having support portions 12 that support the permanent magnets 13, and wedges 14.

To keep the whole assembly in place, nonmagnetic clamps 18 are used, each of these having, on the one hand, an elongate part 19 that is housed in the groove 17 of the active face 15 of the wedge 14, and on the other hand, braces 20 that extend into holes passing through the wedge 14, then between the permanent magnets 13 and finally in holes in the core 2 (these not being visible) so as to be fastened to the latter, for example by screwing or by riveting (as a variant, the braces could pass through the core 2 so as to be fixed directly to the body 100).

The nonmagnetic clamps make it possible to exert a compressive force so as to take up, or even eliminate, the residual gap that may remain owing to the manufacturing tolerances between, on the one hand, the support portions 12 and the permanent magnets 13 and on the other hand, the permanent magnets 13 and the wedge 14. This gap take-up allows the magnetic efficiency of the actuator to increase.

According to one particular aspect of the invention, more particularly visible in FIG. 1, the end face 15 of the wedge 14 lies set back by an amount h relative to the end faces 16 of the lateral branches 11.

Thus, when the armature 4 butts against the core 2, said armature butts only on the end faces 16 of the lateral branches 11 and not on the central branch. In general, and more particularly when the permanent magnets are produced by sintering powder materials, the permanent magnets are very sensitive to shocks. The set-back h makes it possible to protect the permanent magnets 13 from the shocks when the armature 2 strikes the core 4, thereby increasing the lifetime of the actuator.

Furthermore, in the absence of such a set-back, the manufacturing tolerances on the core would give rise to residual gaps between the armature and the branches of the actuator, causing magnetic hysteresis that would disturb the repeatability of the separation of the armature 4 from the core 2. The set-back makes it possible for this hysteresis to be reduced, or even eliminated. For this purpose, a set-back h of the order of a few tenths of a millimeter is preferably chosen, and therefore substantially greater than the gaps, which are of the order of a few tens of microns, so that the set-back h forms, between the armature and the central branch, a large gap, the influence of which predominates over that of the residual gaps when the armature is close to the core. This makes it possible to reduce, or even eliminate, effects of the magnetic hysteresis caused by the residual gaps.

In practice, a set-back h of greater than 0.1 millimeters will preferably be chosen, while still remaining less than 0.35 millimeters, so as not to prejudice the performance of the actuator.

Figure 2:
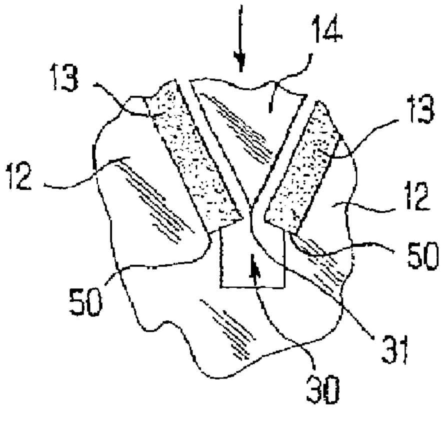
FIG. 2 is a partial schematic view of the actuator of FIG. 1, illustrated in the course of being mounted.

According to one particular aspect of the invention more particularly visible in FIGS. 1 and 2, the core 2 includes a space 30 that extends between the permanent magnets 13 near the tip of the V, in which space the tip 31 of the wedge 14 is engaged. The clamping of the wedge 14 by means of the clamp 18 may result, because of the relatively acute angle of the wedge 14, in a large dispersion in the position of the tip 31 along the X axis. The space 30 allows this dispersion to be absorbed, while preventing any contact between the tip 31 and the rest of the core 2.

Furthermore, the space 30 will be chosen to be deep enough to form a sufficiently large gap between the wedge 14 and the base 10, preventing, in service, magnetic flux from passing between the wedge 14 and the base 10, which would short-circuit the permanent magnets 13.

Finally, the space 30 forms a nonmagnetic region at the base of the permanent magnets 13 at the place where the latter form the tip of the V, thereby making it possible for there to be a sharp separation between the flux lines of the permanent magnets 13 in this region of the core.

The invention is not limited to what has just been described, rather quite to the contrary it encompasses any variant falling within the scope defined by the claims.

In particular, although actuators have been illustrated here in which the permanent magnets form a V, the tip of which is turned toward the base of the core, it will also be possible to place the magnets in such a way that they form a V with the tip directed toward the armature. The magnet support parts of the base will have inclined faces no longer facing each other but being turned toward the lateral branches, whereas the end part of the central branch will no longer have a wedge shape but a hat shape.

The invention claimed is:

1. An electromagnetic actuator, having an actuating member associated with an armature and capable of moving under an action of at least one electromagnet, comprising:

a coil;

a core designed to channel a flux of the coil so as to form a return path in the armature, the core having a base from which branches extend, including a central branch around which the coil extends; and two permanent magnets associated with the core so that the latter channels a flux of the permanent magnets so as to form a return path in the armature, the flux of the coil passing through the magnets, wherein the two permanent magnets are placed in the central branch of the core so as to form a V, which separates the central branch into a support part, which supports the permanent magnets and is integral with the base, and an end part lying above the permanent magnets, and wherein the end part has an active face facing the armature in which a groove lies parallel to the permanent magnets.

2. The electromagnetic actuator according to claim 1, wherein the V formed by the magnets has a downwardly facing point, the end part having a wedge shape.

3. The electromagnetic actuator according to claim 1, comprising means for pressing the end part against the permanent magnets.

4. The electromagnetic actuator according to claim 1, wherein one of the parts forms a point engaged between the permanent magnets, whereas the other of the parts has a space at the base of the V formed by the permanent magnets.

5. The electromagnetic actuator according to claim 4, wherein the space has a sufficient depth to prevent, in service, magnetic flux from passing between the parts of the core.

6. The electromagnetic actuator according to claim 1, wherein the end part has an end face which lies set back by an amount relative to end faces of the other branches.

7. The electromagnetic actuator according to claim 6, wherein the set-back lies between 0.1 mm and 0.35 mm.

8. An electromagnetic actuator, having an actuating member associated with an armature and capable of moving under an action of at least one electromagnet, comprising:

a coil;

a core designed to channel a flux of the coil so as to form a return path in the armature, the core having a base from which branches extend, including a central branch around which the coil extends; and two permanent magnets associated with the core so that the latter channels a flux of the permanent magnets so as to form a return path in the armature, the flux of the coil passing through the magnets, wherein the two permanent magnets are placed in the central branch of the core so as to form a V, which separates the central branch into a support part, which supports the permanent magnets and is integral with the base, and an end part lying above the permanent magnets, the electromagnetic actuator further comprising means for pressing the end part against the permanent magnet, wherein the pressing means comprise a nonmagnetic clamp having an elongate part that lies in a groove of an active face of the end part parallel to the permanent magnets and at least one strut that extends from the elongate part so as to pass through the end part and pass between the permanent magnets.

* * * * *